United States Patent [19]
Epstein

[11] Patent Number: 5,392,188
[45] Date of Patent: Feb. 21, 1995

[54] POWER SURGE TRANSIENT VOLTAGE PROTECTION AND FILTERING CIRCUIT HAVING CURRENT CONTROLLING CHARACTERISTICS

[76] Inventor: Barry M. Epstein, 7523 Cliffbrook, Dallas, Tex. 75240

[21] Appl. No.: 894,658

[22] Filed: Jun. 5, 1992

Related U.S. Application Data

[63] Continuation-in-part of Ser. No. 655,853, Feb. 15, 1991.

[51] Int. Cl.⁶ .............................................. H02H 9/04
[52] U.S. Cl. ................................... 361/118; 361/56; 361/91; 361/111
[58] Field of Search ..................... 361/56, 57, 59, 91, 361/111, 117, 118, 119

[56] References Cited

U.S. PATENT DOCUMENTS

| | | | |
|---|---|---|---|
| 4,587,588 | 5/1986 | Goldstein | 361/56 |
| 4,642,733 | 2/1987 | Schacht | 361/118 |
| 4,675,772 | 6/1987 | Epstein | 361/56 |
| 4,677,518 | 6/1987 | Hershfield | 361/56 |

*Primary Examiner*—Marc S. Hoff
*Assistant Examiner*—S. Jackson
*Attorney, Agent, or Firm*—Terry M. Gernstein

[57] ABSTRACT

A power surge and transient voltage protection circuit includes a plurality of MOVs connected across power conductors leading to a load. The MOVs are in parallel with each other and in parallel with a selenium suppressor and with a capacitor. The selenium suppressor element has a minimum turn-on clamping voltage associated therewith that is below a voltage level that may cause damage to the load if such voltage were applied to the load. Each of MOVs has a minimum turn-on clamping voltage that is above that of the selenium suppressor, yet is still below that voltage level that could damage the load. The plurality of MOVs shunt a portion of a current across the supply conductors around the selenium suppressor as a rising voltage exceeds the selenium suppressor turn-on voltage. The circuit can be used in conjunction with surge and transient protection elements located within a circuit breaker panel, a circuit breaker or circuit breaker housing or a similar convenient module to be installed in a circuit breaker panel, or electrical distribution or meter box whereby losses associated with a line conductor connecting the circuit and the panel can be accommodated in the overall V/I curves associated with the networks. The circuits on the panel and/or on supanels or modules can have elements that are incorporated in the present circuit.

25 Claims, 4 Drawing Sheets

POWER SURGE TRANSIENT VOLTAGE PROTECTION AND FILTERING CIRCUIT HAVING CURRENT CONTROLLING CHARACTERISTICS

TECHNICAL FIELD OF THE INVENTION

The present application is a continuation-in-part of U.S. patent application Ser. No. 07/655,853, filed on Feb. 5, 1991, and the disclosure thereof is fully incorporated herein by reference.

The present invention relates to the general art of electrical power equipment, and to the particular field of power surge suppression.

This application incorporates by reference U.S. patent application Ser. No. 07/431,681 filed on Nov. 3, 1989.

BACKGROUND OF THE INVENTION

There are many applications where it is necessary to protect electrical equipment from power surges, high energy transients and high frequency noise or random voltage embedded in a power sine wave that could damage or adversely affect the operation of such equipment. Such protection is particularly important for equipment having highly sensitive or complex loads that are susceptible to power surges and/or high frequency content transients. For example, conventional data processing equipment includes sensitive components which are particularly susceptible to damage or loss of stored data therein due to reactive voltage spikes occurring as a result of power surges in the supply lines, switching transients, or as a consequence of external causes such as lightning that strikes the supply line or produces an electromagnetic pulse which is inductively coupled into the supply line, or reactive spiking or ringing within the load's own power supply transformers which upsets the DC output of the internal power supply. Some of these conditions may also occur with respect to, and thus damage, sophisticated telecommunication and telephone equipment installations, for example.

Optimum surge suppression electronic filtering circuitry is designed to maintain a power waveform that, at all times, is the least disturbing to the load equipment it serves. Therefore, the high frequency content produced by an external power source, or by a surge suppressor, or by the load itself, must be kept to a minimum. A low suppression level close to the peak of a sine wave must also be obtained without distorting the source waveform and with maximum reliability of the suppressor.

These requirements rule out the use of many presently available suppressors. The fact that no single device adequately functions as a suppressor for all transients that may be encountered has led to the development of what are known in the art as hybrid circuits. Such hybrid circuits often combine a crowbar-type device such as a gas tube or the like, with a clamping device, such as an MOV (metal oxide varistor) and/or a selenium suppressor. Some of these suppressor circuits include several stages. However, these devices generally include circuit elements, such as inductors, in series in the power lines between the suppressor elements and/or suppressor stages. The present inventor has found that such series circuit elements reduce the effectiveness of such suppressors. For example, an inductor may limit current flow to a second stage thereby placing a high load on a prior stage. Such high loading may endanger one of the stages. Such series elements may also slow the overall reaction time of the suppressor, and may even make the reaction time so slow as to seriously vitiate the effectiveness of the suppressor. Still further, such series elements may influence the power wave applied to the electronic equipment being protected even if the suppressor has not been activated.

Still a further drawback to suppressors having a plurality of stages with circuit elements between the stages is the problem of placing the suppressor as close to the load as possible. As was discussed in U.S. Pat. No. 4,835,650, the disclosure of which is fully incorporated herein by reference, the leads in a surge suppressor network can influence the operation of that network. As is discussed in that patent, it is beneficial to shorten the lead lines in such networks as much as possible. Some surge suppression networks include a selenium element. Such elements are often too large to be physically placed close to the load or to other terminals. Therefore, there may be lead lines that may influence the operation of the suppressor network. This patent discussed this problem as being associated with let-though voltage.

Many presently available surge suppression networks place one of the elements thereof in an electrical location that may expose that particular element to high energy spikes. Such elements may fail thereby exposing the remainder of the network or the load to further problems. As discussed above, this is especially true in networks with series circuit elements interposed between stages of a multistage suppressor network.

Still further, many presently available protective networks have not been completely satisfactory for all conditions of service because they do not prevent the adverse effects of surges and transients occurring at the source, or as a consequence of local or internal circuit conditions such as a circuit breaker actuation, as well as being effective to prevent reactive spike build-up at the load side of the network. It is desirable to provide such surge and transient suppression in synergistic combination with power filtering, as well as to adapt such protective networks for convenient installation with multiple phase loads as well as single phase loads. Further, it is desirable that the protective network be capable of handling heavy loads so that it will not fail under high stress conditions. Many prior art approaches consider elementary spike protection only, not the overall protection and implications on the load equipment itself.

Other prior art approaches have attempted to parallel multiple avalanche diode, MOV or similar devices having identical V/I characteristics. In such applications, exacting testing must be performed to match all devices for identical performance. Such a match rarely can be maintained in use because of parts wear. Often, these devices still insert series circuit elements between stages. In some cases, the manufacturers of such devices may insert them merely to improve the way a specification sheet looks to a potential customer. However, these devices may fail in a very short time and will not be of real value.

Some prior hybrid circuits, such as disclosed in U.S. Pat. No. 4,616,286, include a selenium surge suppressor in parallel with an MOV and a capacitor. While somewhat effective, this type of circuit has drawbacks because the overall circuit is not designed as a unit but as discrete elements. For example, the just-mentioned patented circuit has the MOV element turn on after the voltage has exceeded the level of the selenium element turn-on voltage. This concept does not account for the action of the V/I curve of the overall circuit, and does not account for what happens to the current while the selenium device is conducting and before the MOV device has effectively activated. In this area of the V/I curve, substantial amounts of current can be conducted to the load, and may be damaging to some load elements under certain conditions. In fact, the just-mentioned patented device has discrete transition levels for each element. This concept may have "discontinuities" in the V/I curve associated with transition in operating points for the individual elements of the overall network that may not be desirable in some situations. In such networks, the current associated with the load is not precisely controllable when the selenium device is turned on and the MOV has not yet reached the clamping state. Such current can be significant in some situations and may damage suppressor elements such as the selenium or MOV.

A still further problem with prior art hybrid networks such as disclosed in the U.S. Pat. No. 4,616,286 patent results because the resistance of the lead lines connecting the single MOV to the power leads associated with the load may be significant with respect to the resistance of the single MOV when that MOV turns on whereby the overall electrical characteristics of the protector network with respect to the load may be adversely affected. However, since devices such as this patented device are simply using the MOV as a "step-in" element such problems are not considered.

Yet a further problem with many prior art networks is the difficulty and expense associated with replacing one of the circuit elements that may have failed. This problem is exacerbated by the set up of many prior art networks that expose one or more of the elements thereof to excessively high energy spikes.

Therefore, there is a need for a power surge and transient voltage protection network that reacts quickly enough to be able to accommodate modern electronic equipment, and will have a minimum let-through voltage, while not influencing the wave form of the power being applied to the load or placing any element of the network in a position to be exposed to an unduly high level of an energy spike. More specifically, there is a need for a power surge and transient voltage protection network that can have the overall V/I characteristics thereof customized to meet the exact needs of the particular load, and can be modified so current flow in the power conductor lines can be controlled at all times during activation of the network, including the time when one suppressor element is turned on but the voltage across the load lines has not yet reached a level associated with the turn on clamping voltage of a second suppressor element.

The parent application discloses and discusses a panel that can be used to connect electronic equipment to a source of power in a manner that permits efficient and accurate connection of power surge protecting and filtering circuits into a building wiring system. This panel has protection circuitry installed therein to provide voltage and transient protection. While this panel is extremely effective, it can be further improved by combining it with a power surge and transient protection network having the V/I characteristics thereof customized as discussed above. In such a set up, the V/I characteristics of the overall network can be further controlled using the set-up disclosed herein in combination with elements located directly in the panel. In this manner, still further customizing can be achieved.

Specifically, the inventor has noted that conductors connecting elements or circuits in a system together or to other elements can cause losses in voltage in the overall system. To be most effective, such line losses should be accounted for in surge and transient protection systems. If such line losses are properly accounted for, the overall V/I characteristics of a system can be quite accurately customized.

For maximum efficiency, the customizing should be amendable to easy mechanical connection and efficient integration into a standard electrical distribution system.

OBJECTS OF THE INVENTION

It is a main object of the present invention to provide a power surge transient voltage protection and filtering network that can react quickly enough to protect modern electronic loads.

It is another object of the present invention to provide a power surge transient voltage protection and filtering network that can have at least one of its elements located physically close enough to terminals associated with the network to minimize let-through voltage.

It is another object of the present invention to provide a power surge transient voltage protection and filtering network that will not unduly influence the power applied to a load when the network is not functioning.

It is another object of the present invention to provide a power surge transient voltage protection and filtering network that does not unduly expose any major element thereof to high energy spikes.

It is another object of the present invention to provide a power surge transient voltage protection and filtering network that includes a warning circuit so that if a component fails, or is ready to fail, a user will be notified such that catastrophic failure will not occur in the event energy is not evenly distributed throughout the network.

It is another object of the present invention to provide a power surge transient voltage protection and filtering network that does not require exact matching of any redundant elements.

It is another object of the present invention to provide a power surge transient voltage protection and filtering network that permits modification of the overall V/I characteristic curve associated with the network to meet specific needs, while also permitting further modification for other loads.

It is another object of the present invention to provide a power surge transient voltage protection and filtering network that includes a plurality of different suppressor elements and will permit controlling current flow after an increasing voltage has reached a level at which one suppressor element has turned on but has not yet reached a level at which a second suppressor element reaches a turn on clamping voltage.

It is another object of the present invention to provide a power surge and transient voltage protection network that can be combined with elements located directly in a breaker-type panel to modify and control the V/I characteristics of an overall system.

It is a specific object of the present invention to provide a power surge transient voltage protection and filtering network that has a plurality of surge and transient protection elements connected in direct parallel relationship with each other and with a filtering element across power lines.

SUMMARY OF THE INVENTION

These, and other, objects are achieved by a surge protector network that includes a filtering element connected across power supply lines leading to a load, with a plurality of voltage suppressor elements connected across those same lines in direct parallel relationship with each other and with the filtering element.

Specifically, the network includes a capacitor connected across the power lines, a first voltage suppressor also connected across the same lines in parallel with the capacitor and a voltage suppressor network also connected across those same lines and in parallel with the capacitor and with the first voltage suppressor. No discrete series circuit elements are interposed between the capacitor and the voltage suppressor or between the voltage suppressor and the voltage suppressor network. Therefore, these circuit elements are all in truly parallel relationship with each other as defined in the standard electronic textbooks as having such circuit elements connected to the same pair of terminals.

Most specifically, the suppressor network includes a plurality of suppressor elements all connected in parallel with each other. These suppressor elements are preferably metal oxide varistors (MOV) while the first suppressor element preferably is a selenium suppressor.

High frequency transients are attenuated by the capacitor, and the selenium suppressor will be able to form up to line voltage to accommodate a major portion of the surges and transients. However, should the surge or transient exceed a predetermined value above which may exceed the capacity of the selenium suppressor to accommodate at a desired V/I curve point, the network of plural parallel MOVs will accommodate the energy surge or transient. The MOVs are physically small enough to be located closely adjacent to the load whereby let-through voltage is minimized. Still further, the MOVs need not be exactly matched since current will be shared by all of the MOVs and the selenium suppressor.

Still further, by placing all of the elements of the protector network in direct parallel relationship with each other, the overall characteristics of the network can be selected in a manner that is not influenced by the requirements of the load to as great a degree as would be the case if some portion of the network were in a series connection with the power leads.

The selenium suppressor provides surge protection in the voltage range of its clamping voltage up to the clamping voltage of the parallel connected MOV suppressors, and at current levels which are safely conducted by the selenium suppressor. That is, the surge current is shunted by the selenium suppressor for voltage levels less than the turn-on clamping voltage of the MOV suppressors. The MOVs remain substantially in a non-conducting, open circuit condition until the surge voltage exceeds the turn-on clamping voltage of the MOV suppressors. After turn-on of the MOV suppressors, the total current flow is divided and shared by the selenium varistor and the multiple MOVs.

In practice, at higher energy levels, the selenium suppressor may be in the "turn-up" region of a V/I dynamic resistance curve associated therewith. However, since the MOVs are not really "switches" that turn on at a specific voltage level, but will conduct some amount of current even before a rising voltage reaches a so-called high current turn-on level for the MOVs, some current will be drawn through the MOVs after the selenium suppressor element has turned on but before the voltage reaches a significant high current turn-on clamping level associated with the MOVs. Such current sharing shunts away some current through the paralleled MOV suppressors and results in an overall V/I dynamic resistance curve for the overall paralleled network that is flatter in the region between the turn-on clamping voltage of the first suppressor and the typical turn-on clamping voltage of the second suppressor than prior networks that include only a single suppressor of each type. After the MOVs are turned on, the curve associated with the network of the present invention tends to remain continuous and at a voltage level that is lower than a voltage level for that curve associated with either of the elements alone. At the same time, high reliability is achieved for the total configuration since the shared current flow through parallel connected MOV suppressors is small enough to each individual MOV to be well below the typical maximum rated current for such individual MOV.

Still further, since the MOVs are sharing current the resistance of the lead lines associated with each MOV is not as significant as it might be if the network used only a single MOV.

The relative dynamic resistances also allow simple combination of the various suppressor devices without requiring complex and exacting selection of matching of devices.

As discussed above, line conductors used in systems of the sort of interest herein can cause trans,lent voltage drops, which voltage drops should be fully considered in customizing a system. The system disclosed herein provides customizing of an overall system, yet may, in practice, be connected to a main or subpanel by a conductor. Such conductor, or conductors, may introduce a transient voltage drop that should be accounted for to fully customize and improve the overall system. The panel disclosed in the parent patent application connects a load to a source of power and provides a means for effecting this customizing because such panel can be fitted with varistors, such as MOV's, and/or filter means, such as capacitors, that co-operate with the elements of the network disclosed herein to compensate for typical losses associated with line conductors connecting the panel to the network disclosed herein.

It is noted that space limitations in the panel may set limits on the physical size of the elements located in the panel. However, due to the co-operation among the elements disclosed herein, such size limitations are not important and small elements can be used in the panel while reducing the possibility of damaging those elements due to a power surge or spike. These panel-located elements can be wired into the panel as in a retro-fit or the like, or can be mounted therein in a module-like form whereby mounting and/or replacement are expeditious. The module can be in a circuit breaker housing or the like. This facilitates expeditious connection of the network to a panel. The module can be connected directly to the buses of the panel. The network can also be wired directly in the panel if suitable. These wiring systems and modules can also include telemetry equipment as well.

As mentioned above, maximum efficiency should be achieved for easy mechanical connection and efficient integration into a standard electrical distribution system. This efficiency is achieved using the networks embodying the present invention. For example, in a circuit breaker panel with modular plug-in or bolt-in breakers, the suppression/filter circuitry may be integrated with a breaker or built inside a breaker module. On a bus system, it may be integrated into a standard bus-tap mechanized configuration for application directly on the bus. A special load circuit may or may not emanate from the custom configuration.

BRIEF DESCRIPTION OF THE DRAWING FIGURES

DETAILED DESCRIPTION OF THE PREFERRED EMBODIMENT OF THE INVENTION

Figure 1:
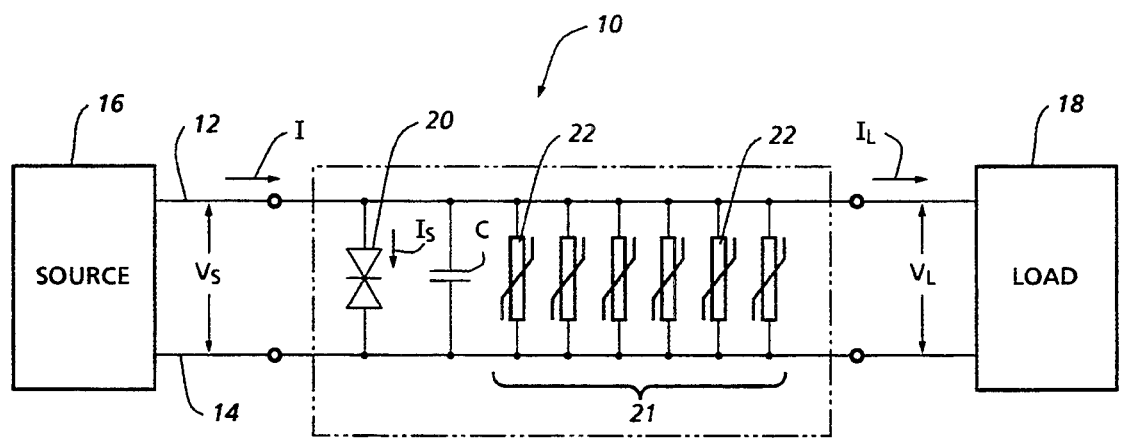
FIG. 1 illustrates the basic surge voltage protector and filter network of the present invention.
Figure 2:
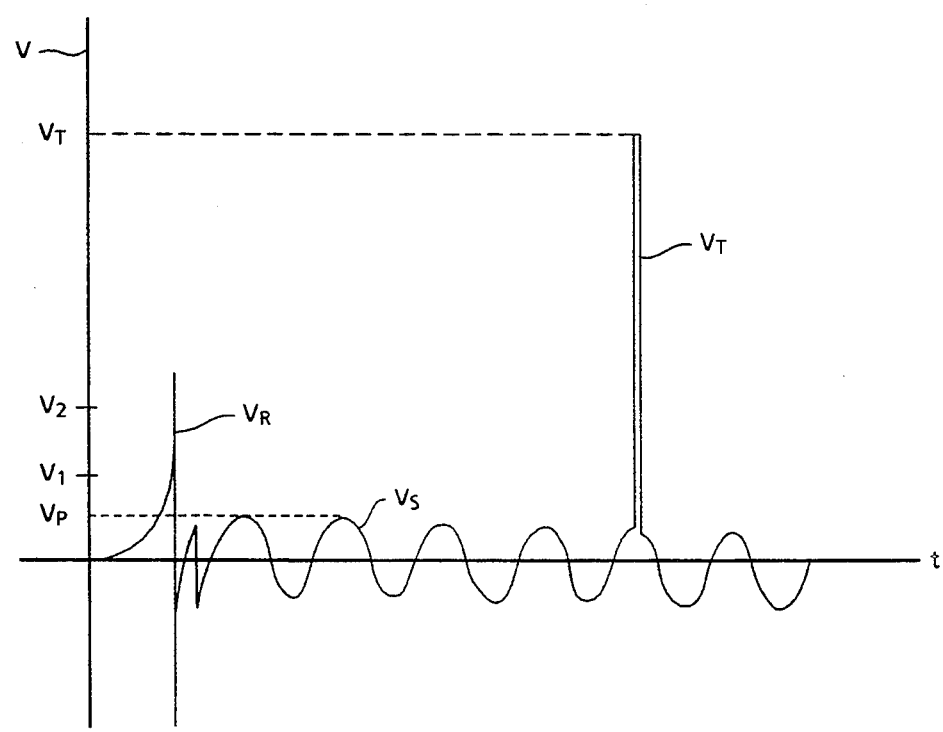
FIG. 2 is a graphic representation of source voltage waveform versus time as applied to the input of the surge suppression network shown in FIG. 1.

Shown in FIG. 1 is a high energy/high voltage and low energy/low voltage surge suppression circuit 10 that is connected across power conductors 12 and 14 of a power source 16. As shown in FIG. 2, the power source 16 produces power in a sinusoidal waveform $V_S$. High energy reactive transients $V_R$ and spike overload transients $V_T$ are superimposed on the waveform $V_S$ as a result of external causes such as direct or indirect lightning strikes, reactive spiking caused by power interruption or reconnection, or as a result of deliberate overloading during performance testing.

The suppression circuit 10 is inserted in a parallel connection across the power conductors 12 and 14 that conduct alternating current power from the source 16 to an electrical load 18. The purpose of the surge suppression circuit 10 is to minimize adverse effects of the external disturbances on the performance of sensitive electronic components within the load 18, and also to prevent damage to the load 18 as a result of high energy transient voltages $V_R$ or $V_T$ that may be impressed across the power conductors 12 and 14. The circuit 10 minimizes such disturbances at all times with respect to the load 18, and also minimizes the high frequency components and the surge voltage amplitude threshold, while not interfering with the basic power sine wave.

The circuit 10 includes a capacitor C connected across the power conductors 12 and 14 for reducing the high frequency component of disturbances applied to these conductors. The capacitor co-operates with the internal impedance of the source to produce a low pass filter that effectively attenuates high frequency components of high energy transients. The amount of attenuation, and the cut-off frequency at which substantial attenuation begins is determined by the magnitude of the capacitor C, which value can be adjusted as required. In the preferred form of the circuit 10, for operation of the power voltage at 60 Hz, the value of capacitor C is in the range of at least two microfarads up to about twenty-eight microfarads. In addition, small value high frequency capacitors such as ceramics, or other such elements, may be connected in parallel with the capacitor C to compensate for turn-on delay of the suppression devices or circuitry. In an alternate form, a small capacitor could be located in the panel, especially in a modular configuration.

The circuit 10 further includes a first voltage suppressor, such as selenium voltage suppressor 20 connected to the power conductors 12 and 14 in parallel with the capacitor C. In the preferred form of the circuit 10, the selenium suppressor is large in area.

The circuit 10 further includes a voltage suppressor network 21 that is connected across the power conductors 12 and 14 in parallel relationship with the capacitor and with the first voltage suppressor. The voltage suppressor network 21 includes a plurality of voltage-dependent varistors, such as MOV 22, each connected across the power conductors in parallel with each other and in parallel with the capacitor C and with the selenium suppressor 20.

Figure 3:
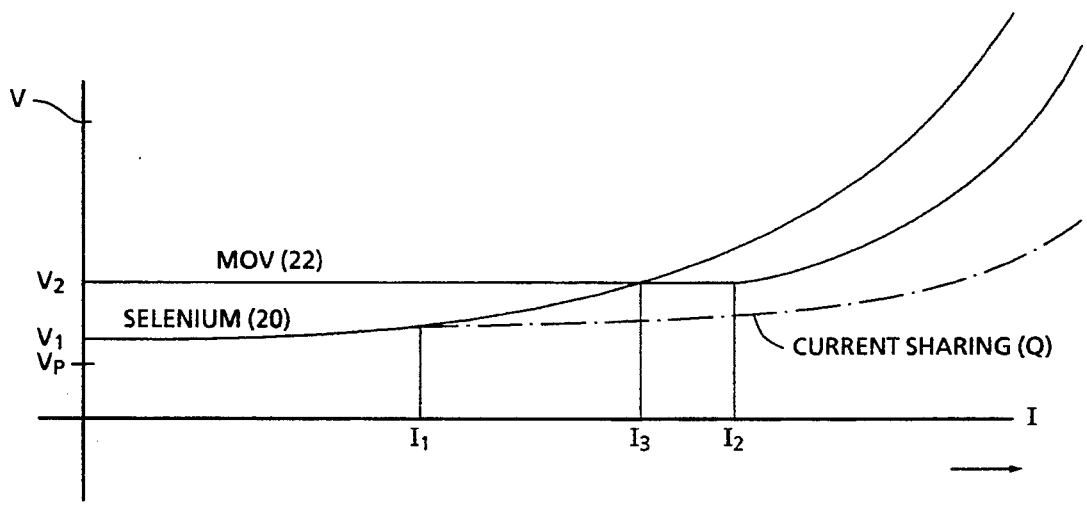
FIG. 3 is a graphic representation of the voltage/current characteristics of selenium and MOV suppressor devices as a function of current.

As illustrated in FIG. 3, each voltage suppressor has its own characteristic V/I curve. The selenium suppressor 20 has a V/I curve that is essentially flat at a turn-on clamping level $V_1$ from initial turn on until current level $I_1$ is reached, at which current the V/I curve turns sharply upward whereby voltage increases rapidly for small increases in current. FIG. 3 also includes a characteristic V/I curve labeled MOV 22. This curve remains essentially flat at a level $V_2$ from initial turn on to a current value of $I_2$, at which current the slope of that V/I curve turns upwardly rapidly so that voltage increase rapidly for small increases in current. As can be seen in FIG. 3, $V_2$ exceeds the value of $V_1$ until current level $I_3$ is reached.

However, due to the parallel relationship of a plurality of MOVs 22 and the selenium suppressor 20, the overall V/I curve for the combination of elements remains flat at a value below the V/I curve associated with either the MOVs or with the selenium suppressor after current reaches the value of $I_1$. Until the current reaches a value of $I_3$ and/or the voltage reaches the value of $V_2$, the selenium suppressor accommodates the voltage, albeit at an increasing level, since the voltage has not reached the turn-on level for the MOVs. However, between the voltage levels $V_1$ and $V_2$, the parallel relationship of the plural MOVs causes some current to be shunted across the MOVs even though the voltage has not yet reached level $V_2$. This results because the MOVs do not have a specific voltage at which they are turned on in the manner of a switch and can accept small amounts of current even before the voltage reaches level $V_2$. The current sharing associated with the plural MOVs causes the overall V/I curve associated with the circuit 10 to be essentially flat as indicated in FIG. 3 by curve Q even though the voltage has not reached level $V_2$.

After the voltage reaches level $V_2$, the voltage has reached the turn-on level for the MOVs, and any further increase in voltage level is reduced by the combination of the selenium suppressor and the MOVs. However, the selenium suppressor is still taking the major portion of the current increase.

As can also be seen in FIG. 3, the characteristic V/I curve associated with the MOVs changes after current reaches $I_2$ and a small increase in current will result in a large increase in voltage. However, because the selenium suppressor is accommodating the major portion of the voltage increase, the overall characteristic curve Q does not have a change that corresponds to such change in slope of curve MOV 22.

Therefore, as can be seen in FIG. 3, the inclusion of a plurality of MOVs in the circuit 10 in parallel with each other and in parallel with the capacitor and with the selenium suppressor results in an overall V/I characteristic curve Q that is continuous and lower than any one suppressor element acting alone and has current characteristics that are extremely favorable, especially in the area between voltages $V_1$ and $V_2$ and after current has exceeded $I_1$.

Both the selenium suppressor 20 and the MOV suppressors 22 are effectively open circuited when voltages below a predetermined minimum are impressed across their terminals, and exhibit a high degree of conduction when the voltage across the terminals exceeds the minimum voltage. Thus, upon the occurrence of an excessive voltage across the particular suppressor, its effective resistance is reduced, thereby shunting the excessive current through the device and clamping the voltage at that level. As a result, the selenium suppressor 20 and MOV suppressors 22 are principally effective to protect the load 18 against power surges and voltage transients, and both are also effective to prevent reactive spike voltage build-up as a consequence of conditions occurring within the load 18 or a impressed upon the power conductors 12 and 14.

The minimum turn-on clamping voltage $V_1$ of the selenium suppressor is selected to be below that voltage that would damage the load 18; whereas the minimum turn-on clamping voltage of the MOVs is above that of the selenium suppressor but still below that voltage above which the load 18 or its components may be damaged. Since the selenium suppressor is the main protection element, its minimum turn-on clamping voltage thereof will be selected to be below that clamping voltage of the MOVs which will be protected when they are turned on by the current sharing associated with the parallel connection between each other and between the MOVs and the selenium suppressor.

Due to the current sharing characteristics of the circuit 10, the total surge current associated with a high energy transient is divided and distributed on a continuous basis through the selenium suppressor 20 and through each of the MOV suppressors 22. The MOV suppressors 22 protect the selenium suppressor 20 at very high current levels by sharing the current and by clamping the applied surge voltage at a safe level below the maximum voltage rating of the selenium suppressor. Moreover, the multiple MOV suppressors 22, as many as six or more, are connected in parallel across the selenium suppressor 20 to divide the total surge current and distribute it through the parallel connected suppressors 20 and 22 at substantially reduced current levels. Thus, the total surge current is divided and reduced to a level for each suppressor as determined by the current sharing characteristics associated with parallel connected elements. By limiting the surge current level applied to any one suppressor element, the useful operating life of each suppressor element can be extended, reliability of the overall suppressor circuit 10 is improved substantially, and the suppression V/I curve of the composite waveform can be tailored as desired. The tailoring can be effected by adding MOVs having desired operating characteristics to the circuit. Due to the sharing of currents, the composite current sharing V/I waveform Q shown in FIG. 3 is lower than the curve for any single element acting alone and is essentially flat.

It is noted that alternate configurations can be used. For example, selenium with a higher turn-on than the MOV initial turn-on could be used. The two elements will still co-operate effectively at high transient currents to produce a desirable V/I curve. It is also noted that the composite current sharing V/I waveform Q can be affected by varying the selenium parameters or by using and varying the parameters of other similar varistor devices.

Figure 4:
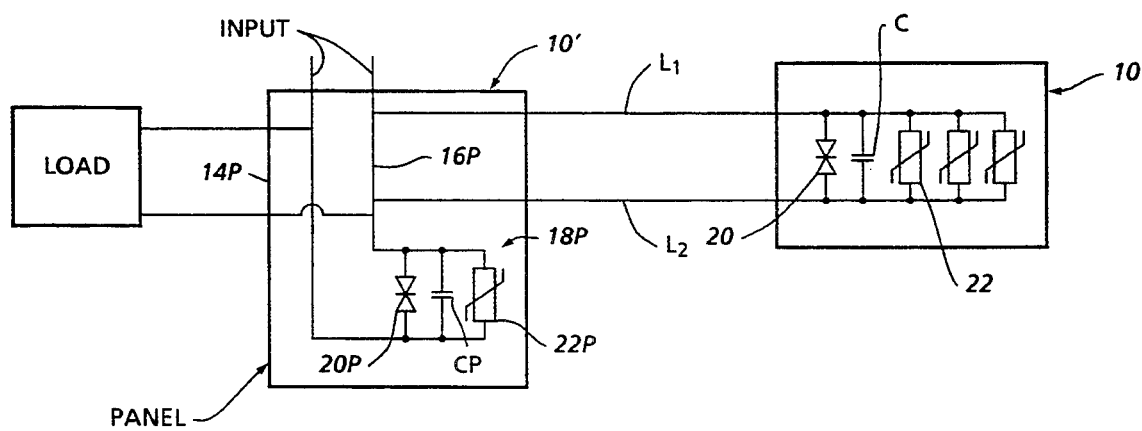
FIG. 4 illustrates a surge protector and filter network of the present invention in combination with a unitary panel as disclosed in the parent patent application.

FIG. 4 shows the suppression circuit 10 in combination with a panel 10'. The panel 10' is identical to the main panel 10 disclosed in the parent application and therefore will not be discussed in detail herein with reference being made to that parent application for such detailed discussion. It is noted herein however that the panel 10' includes a phase bus 14P and a neutral bus 16P. A surge and transient protection network 18P is mounted directly in the panel 10', and includes a surge suppressor, such as selenium cell 20P, a filter element, such as capacitor CP, and a voltage dependent varistor, such as MOV 22P, connected across the phase and neutral buses 14P and 16P. The panel 10' is used in association with a surge suppression circuit 10 described above. The panel 10' is connected to the circuit 10 by line conductors $L_1$ and $L_2$, with the circuit serving the function discussed above.

As also discussed above, line conductors $L_1$ and $L_2$ have a voltage drop associated therewith. In order to fully customize and improve the operation of both the panel and the circuit, the present invention connects the elements of network 18P to the network 10 so the elements of these two systems co-operate with each other. In this manner, the above-discussed sharing of load occurs with the elements of network 18P included. Therefore, even if the MOV 22P is physically small, or the capacitor CP is physically small, these elements will operate in conjunction with the large selenium cell 20 in the manner discussed above to be "protected" by that cell. The current sharing characteristics of the overall circuit will now include the elements in network 18P, and the overall V/I curve can be further refined for the exact system. The selenium cell 20P on the panel 10 can also be small to be physically accommodated on the panel.

Figure 5:
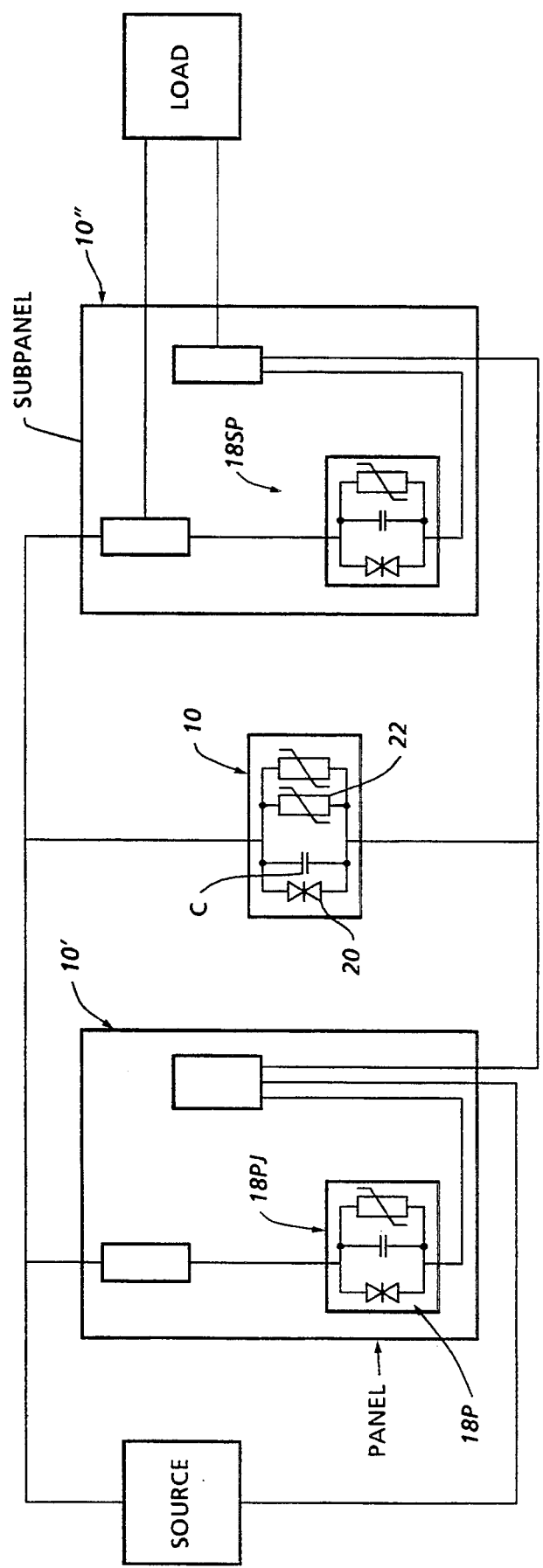
FIG. 5 illustrates a surge protector and filter network of the present invention in combination with a unitary panel and a unitary subpanel as disclosed in the parent patent application.

The parent application also discloses networks 18 on a panel/subpanel combination. The circuit 10 disclosed herein can be used in conjunction with such combination as well as indicated in FIG. 5. The networks 18P and 18SP include elements as discussed above that are sized to be equal to, or to co-operate with the elements in the circuit 10 to customize and improve the overall V/I performance.

The network 18P is shown in FIG. 4 as being mounted on the panel 10' in the form of a circuit mounted on a panel; however, the network 18P can be mounted on a plug-in subassembly, such as module 18PI shown in FIG. 5 on panel 10'.

In practice, the majority of current flow will be conducted through the selenium device 20, with just a fraction of the current diverted through the MOV devices 22 to achieve the desired composite V/I flow curve Q and individual device protection by limiting the current flow through each suppressor.

The unmatched selenium device 20 and MOV devices 22 may be easily combined without careful matching since the principal role of the MOV devices is to divert current to obtain a lower operating point on the composite, selenium dominant, dynamic V/I curve Q rather than to actually protect the load as is the case with most presently available protection circuits, even the hybrid circuits. Since the selenium device 20 is the dominant current suppressor element, multiple MOV devices 22 may also be utilized without exacting matching tests. Unmatched production units of the same class are close enough. Similarly, other unmatched devices, such as avalanche diodes, may be used to good advantage.

As an additional feature of the present invention, the protective network 10 is particularly adaptable for convenient installation with, and protection of, multiple phase loads, with separate surge protection circuits 10 being connected across each phase and to neutral, or across each phase and to ground.

Figure 6:
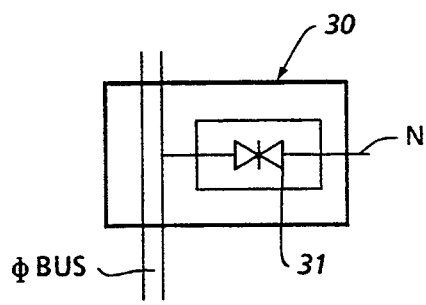
FIG. 6 illustrates a surge protector and filter network of the present invention in combination with a unitary panel as disclosed in the parent patent application in which the surge suppressor is in a breaker module.
Figure 7:
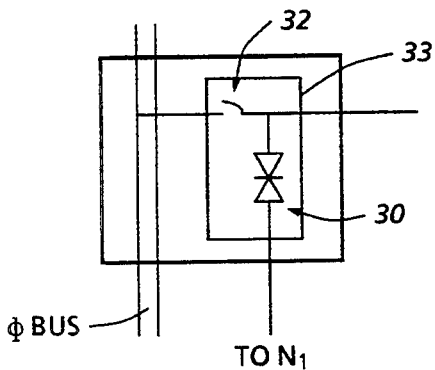
FIG. 7 illustrates another form of the embodiment shown in FIG. 6.
Figure 8:
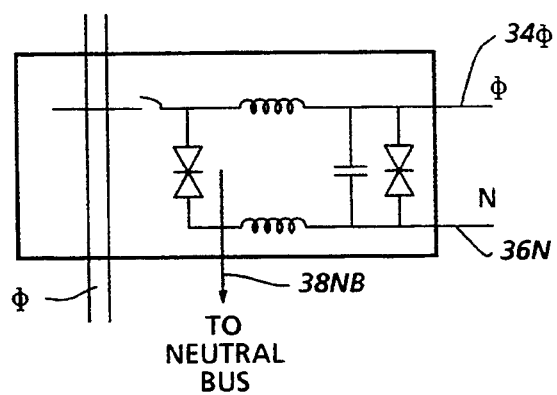
FIG. 8 illustrates another form of the embodiment shown in FIG. 6.
Figure 9:
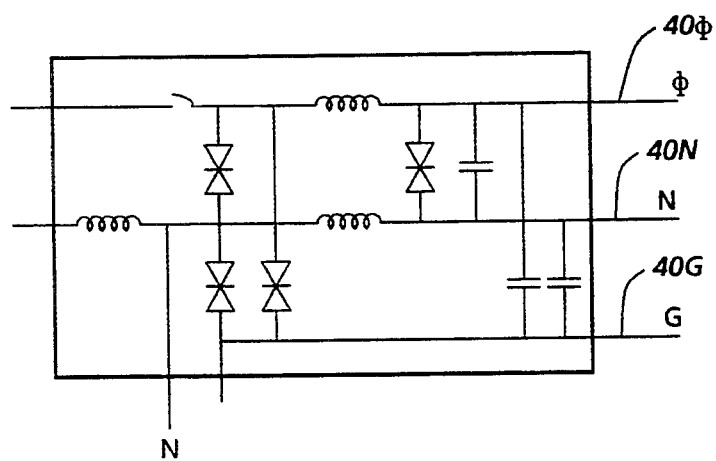
FIG. 9 illustrates another form of the embodiment shown in FIG. 6.

Shown in FIGS. 6-9 are several forms of the invention in which the surge and transient protection network is in modular form and can be attached directly to a breaker panel such as is disclosed in the parent application. FIG. 6 illustrates a form of the invention in which the suppressor is in a module 30 connected to a phase bus φ and to a neutral bus N. The module 30 is shown in a circuit breaker housing 31. FIG. 7 illustrates an embodiment in which a circuit breaker 32 is connected to the phase bus φ and to the circuit, or to a standard breaker configuration. The module 32 is shown in a fuse housing 33. The suppressor 30 is connected to the breaker. FIG. 8 illustrates an embodiment in which both a suppressor and a filter are included in a breaker housing. In the FIG. 8 embodiment, a series filter and a neutral wire are included. As shown in FIG. 8, a phase lead $34_\phi$ and a neutral lead $36_N$ are connected to a filtered and suppressed load. A neutral bus $38_{NB}$ is also shown. FIG. 9 illustrates an embodiment in which a ground network is included. Therefore, a ground lead $40_G$ is shown in FIG. 9 along with the phase and neutral leads $40_\phi$ and $40_N$, respectively. In the forms of the invention shown in FIGS. 6-9, an electrician can simply snap a complete protection network into a circuit breaker panel.

It is understood that while certain forms of the present invention have been illustrated and described herein, it is not to be limited to the specific forms or arrangements of parts described and shown.

I claim:

1. A surge protector network comprising:
   A) supply conductors leading from a power source to a load;
   B) a first voltage suppressor connected across said supply conductors, said first voltage suppressor having a minimum turn-on clamping voltage above which may damage the load;
   C) a voltage suppressor network connected across said supply conductors, said voltage suppressor network being connected to said supply conductors to be in parallel with said first voltage suppressor and including a plurality of voltage dependent varistors, each voltage dependent varistor being connected across said supply conductors in parallel with all other voltage dependent varistors and in parallel with said first voltage suppressor, each voltage dependent varistor having a minimum turn-on clamping voltage that is greater than said first voltage suppressor turn-on clamping voltage and less than that voltage above which may damage the load; and
   D) a filter element connected across said supply conductors to be in parallel with said first voltage suppressor and with all of said plurality of voltage dependent varistors.

2. The surge protector network defined in claim 1 wherein the minimum turn-on clamping voltage of each voltage suppressor network voltage dependent varistor is less than the maximum voltage rating and maximum current rating capacity of said first voltage suppressor.

3. The surge protector network defined in claim 1 wherein said first voltage suppressor comprises a voltage-dependent varistor.

4. The surge protector network defined in claim 3 wherein said first voltage suppressor comprises a voltage-dependent element.

5. The surge protector network defined in claim 4 wherein each of said plurality of voltage dependent elements comprises a metal oxide varistor.

6. The surge protector network defined in claim 5 wherein all of said voltage dependent varistors have voltage/current characteristics that are different from each other.

7. The surge protector network defined in claim 6 wherein all of said voltage dependent varistors have voltage/current characteristics that are different from the voltage/current characteristic of said first voltage suppressor.

8. A surge protector network comprising:
   A) supply conductors leading from a power source to a load;
   B) a first voltage suppressor connected across said supply conductors, said first voltage suppressor having a minimum turn-on clamping voltage above which may damage the load;
   C) a voltage suppressor network connected across said supply conductors, said voltage suppressor network being connected to said supply conductors to be in parallel with said first voltage suppressor and having a minimum turn-on clamping voltage that is greater than said first voltage suppressor minimum turn-on clamping voltage and less than a voltage that may damage the load, said voltage suppressor network further including means for shunting current from one of said supply conductors to another of said supply conductors around said first voltage suppressor after a rising voltage across said supply conductors surpasses said first voltage suppressor minimum turn-on clamping voltage and before the rising voltage across said supply conductors reaches said voltage suppressor network minimum turn-on clamping voltage, said means for shunting current including a plurality of voltage dependent varistors, each voltage dependent varistor being connected across said supply conductors in parallel with all other voltage dependent varistors and in parallel with said first voltage suppressor.

9. The surge protector network defined in claim 8 wherein each of said plurality of voltage dependent varistors has a minimum turn-on clamping voltage that exceeds the first voltage suppressor minimum turn-on clamping voltage and is less than that voltage above which the load may be damaged.

10. A surge protector network comprising:
A) supply conductors leading from a power source to a load;
B) a first voltage suppressor connected across said supply conductors, said first voltage suppressor having a first minimum turn-on clamping voltage above which may damage the load;
C) a voltage suppressor network connected across said supply conductors, said voltage suppressor network having a second minimum turn-on clamping voltage above which may damage the load and which is greater than said first minimum turn-on clamping voltage and being connected to said supply conductors to be in parallel with said first voltage suppressor;
D) an overall V/I characteristic curve for said first voltage suppressor and said voltage suppressor network, means for adjusting said overall V/I characteristic curve, said means including means for shunting various amounts of current through said voltage suppressor network around said first voltage suppressor before said voltage suppressor network reaches said second minimum turn-on clamping voltage whereby current is shared by said first voltage suppressor and said voltage suppressor network before said voltage suppressor network reaches said second minimum turn-on clamping voltage and said overall V/I characteristic curve is affected by such current sharing;
E) a filter element connected across said supply conductors to be in parallel with said first voltage suppressor and with said voltage suppressor network; and
F) a filter element mounted in said panel and connected across said supply conductors to be in parallel with said first voltage suppressor and with said voltage suppressor network.

11. The surge protector network defined in claim 10 wherein said means for adjusting said overall V/I characteristic curve includes a plurality of voltage dependent varistors, each voltage dependent varistor being connected across said supply conductors in parallel with all other voltage dependent varistors and in parallel with said first voltage suppressor, each voltage dependent varistor having a minimum turn-on clamping voltage that is greater than said first voltage suppressor turn-on clamping voltage and less than that voltage above which may damage the load.

12. A surge protector network comprising:
A) a panel that includes
 (1) a base,
 (2) a phase bus mounted directly on said base,
 (3) a neutral bus mounted directly on said base, and
 (4) a voltage surge and transient protector network mounted directly on said base to be unitary and integral with said base;
B) supply conductors leading from a power source to said panel;
C) a panel-mounted voltage suppressor mounted in said panel and connected across said supply connectors, said panel-mounted voltage suppressor being mounted on said base and spaced from said voltage surge and transient protector network and having a minimum turn-on clamping voltage above which may damage the load;
D) a panel-mounted voltage dependent varistor mounted in said panel and connected across said supply conductors in parallel with said voltage surge and transient protector network and having a minimum turn-on clamping voltage that is greater than said first voltage suppressor turn-on clamping voltage and less than that voltage above which may damage the load; and
E) a filter element mounted in said panel and connected across said supply conductors to be in parallel with said first voltage suppressor and with said voltage suppressor network.

13. The surge protector network defined in claim 12 further including a panel-mounted filter means mounted in said panel and connected across said supply conductors.

14. The surge protector network defined in claim 13 wherein said filter means includes a capacitor.

15. The surge protector network defined in claim 14 further including a subpanel including a base, a phase bus mounted directly on said base, a neutral bus mounted directly on said base, and a voltage surge and transient protector network mounted directly on said base to be unitary and integral with said base; and further including line conductors connecting said panel and subpanel together.

16. The surge protector network defined in claim 15 further including a second capacitor mounted directly on said subpanel.

17. The surge protector network defined in claim 16 wherein the voltage surge and transient protector network mounted directly on said base is mounted on a plug-in module.

18. The surge protector network defined in claim 16 wherein the voltage surge and transient protector network mounted directly on said base is wired directly into the panel.

19. The surge protector network defined in claim 16 wherein the panel-mounted capacitor is a ceramic capacitor.

20. The surge protector network defined in claim 15 further including a plurality of panel-mounted metal oxide varistors mounted on said panel.

21. The surge protector network defined in claim 4 wherein said voltage-dependent element includes a selenium varistor.

22. A surge protector network comprising:
A) a panel that includes
 (1) a base,
 (2) a phase bus mounted directly on said base,
 (3) a neutral bus mounted directly on said base, and
 (4) a voltage surge and transient protector network mounted directly on said base to be unitary and integral with said base;
B) supply conductors leading from a power source to said panel;
C) a panel-mounted voltage suppressor mounted on said panel and connected across said supply connectors, said panel-mounted voltage suppressor being mounted on said base and spaced from said voltage surge and transient protector network and having a minimum turn-on clamping voltage above which may damage the load;

D) a panel-mounted voltage dependent element mounted on said panel and connected across said supply conductors in parallel with said voltage surge and transient protector network and having a minimum turn-on clamping voltage that is greater than said first voltage suppressor turn-on clamping voltage and less than that voltage above which may damage the load; and E) a filter element mounted on said panel connected across said supply conductors to be in parallel with said first voltage suppressor and with said voltage suppressor network.

23. The surge protector network defined in claim 16 wherein the voltage surge and transient protector network mounted directly on said base is mounted in a circuit breaker housing.

24. The surge protector network defined in claim 16 wherein the voltage surge and transient protector network mounted directly on said base is mounted in a circuit breaker housing along with an LC active filter and with a monitoring and telemetry means.

25. The surge protector network defined in claim 16 wherein the voltage surge and transient protector network mounted directly on said base is mounted in a fuse housing.

* * * * *